United States Patent
Brush et al.

(10) Patent No.: US 6,688,696 B2
(45) Date of Patent: Feb. 10, 2004

(54) AUTOMATIC ARTICULATING SEAT ASSEMBLY

(76) Inventors: Timothy J. Brush, 11517 Morgan Ave., Plymouth, MI (US) 48170; Paul S. DeCaluwe, 12733 Greentree Trail, South Lyon, MI (US) 48178; John R. Ford, 270 Woodridge Dr., Tecumseh, Ontario (CA), N8N 3A4; Jeffrey T. Lambert, 9257 Tanbay St., Commerce Township, MI (US) 48382; Alan R. Mackey, 22098 Brookfield Ct., South Lyon, MI (US) 48178

(*) Notice: Subject to any disclaimer, the term of this patent is extended or adjusted under 35 U.S.C. 154(b) by 0 days.

(21) Appl. No.: 10/143,565

(22) Filed: May 9, 2002

(65) Prior Publication Data

US 2003/0209932 A1 Nov. 13, 2003

(51) Int. Cl.$^7$ .................................................. B60N 2/02
(52) U.S. Cl. ....................... 297/378.1; 297/15; 297/341; 248/395
(58) Field of Search .......................... 297/378.1, 15, 297/322, 334, 341, 317; 296/65.09, 65.13, 65.14; 248/393, 395, 394, 429

(56) References Cited

U.S. PATENT DOCUMENTS

| | | | |
|---|---|---|---|
| 4,043,593 A | * | 8/1977 | Turner |
| 4,395,011 A | | 7/1983 | Torta |
| 5,839,773 A | | 11/1998 | Ban et al. |
| 5,941,602 A | | 8/1999 | Sturt et al. |
| 5,979,964 A | | 11/1999 | Ban et al. |
| 6,099,072 A | | 8/2000 | Sturt et al. |
| 6,123,380 A | | 9/2000 | Sturt et al. |
| 6,152,533 A | | 11/2000 | Smuk |
| 6,270,141 B2 | * | 8/2001 | Moon et al. |
| 6,371,558 B1 | * | 4/2002 | Couasnon |

* cited by examiner

Primary Examiner—Laurie K. Cranmer
(74) Attorney, Agent, or Firm—Clark Hill PLC

(57) ABSTRACT

A seat assembly secured to the floor of an automotive vehicle includes a generally horizontal seat cushion movable between a seating position spaced above the vehicle floor and a stowed position resting against the vehicle floor. A riser is operatively coupled to the seat cushion for supporting the seat cushion in each of the seating and stowed positions. A seat back is pivotally coupled to the riser for movement between a generally upright seating position and a folded position in overlapping relationship with the seat cushion. A slide mechanism is coupled between the riser and the seat cushion for slidably articulating the seat cushion along the riser between the seating position and the stowed position. A first link arm is coupled between the seat back and the seat cushion for automatically controlling the sliding articulation of the seat cushion between the seating and stowed positions in response to pivotal movement of the seat back between the upright seating position and the folded position.

10 Claims, 4 Drawing Sheets

AUTOMATIC ARTICULATING SEAT ASSEMBLY

BACKGROUND OF THE INVENTION

1. Field of Invention

The subject invention relating to an automatically articulating seat assembly, and more particularly, to a seat assembly wherein the seat cushion automatic slidably articulates to a stowed position in response to pivotal movement of the seat back to a folded position.

2. Description of the Related Art

A second and third row of seats behind the driver and passenger row of seats is becoming increasingly common in automotive vehicles such as minivans, sport utilities and all-activity vehicles. These additional rows of seat provide additional passenger capacity in the vehicle and a variety of seating configurations. A maximum amount of cargo space is also desirable in these utility vehicles, however, becomes limited by the addition of second and third rows of seats. The seats typically include a seat cushion for supporting the occupant of the seat and a seat back which may be pivotal between an upright position and a folded position against the seat cushion to provide an additional load floor surface. The seat cushion is typically elevated above the floor of the vehicle by risers such that when the seat back is pivoted to the folded position, the height of the additional load floor surface provided by the seat back relative to the vehicle floor is undesirable.

Articulating seat assemblies have been employed in utility vehicles whereby the seat cushion may be independent pivoted or rotated forwardly from the seating position to an upright position and then the seat back pivoted from the seating position to a folded position filling the void of the seat cushion and against the vehicle floor. However, the folded seat cushion consumes additional cargo space in the vehicle and the articulation of the seat can be cumbersome and require several mechanisms and user operations.

Therefore, it remains desirable to provide a simple, lower profile articulating seat assembly which may be translated from the seating position to a folded and stowed position against the vehicle floor with a single operation by the vehicle occupant.

SUMMARY OF THE INVENTION

According to one aspect of the invention there is provided a seat assembly adapted to be secured to the floor of an automotive vehicle. The seat assembly includes a generally horizontal seat cushion for supporting an occupant on the seat assembly. The seat cushion is movable between a seating position at least partially spaced above the vehicle floor and a stowed position resting against the vehicle floor. A riser is operatively coupled to the seat cushion for supporting the seat cushion in each of the seating and stowed positions. A seat back is pivotally coupled to the riser for movement between a generally upright seating position and a folded position in overlapping relationship with the seat cushion. A slide mechanism is coupled between the riser and the seat cushion for slidably articulating the seat cushion along the riser between the seating position and the stowed position. A first link arm is coupled between the seat back and the seat cushion for automatically controlling the sliding articulation of the seat cushion between the seating and stowed positions in response to pivotal movement of the seat back between the upright seating position and the folded position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
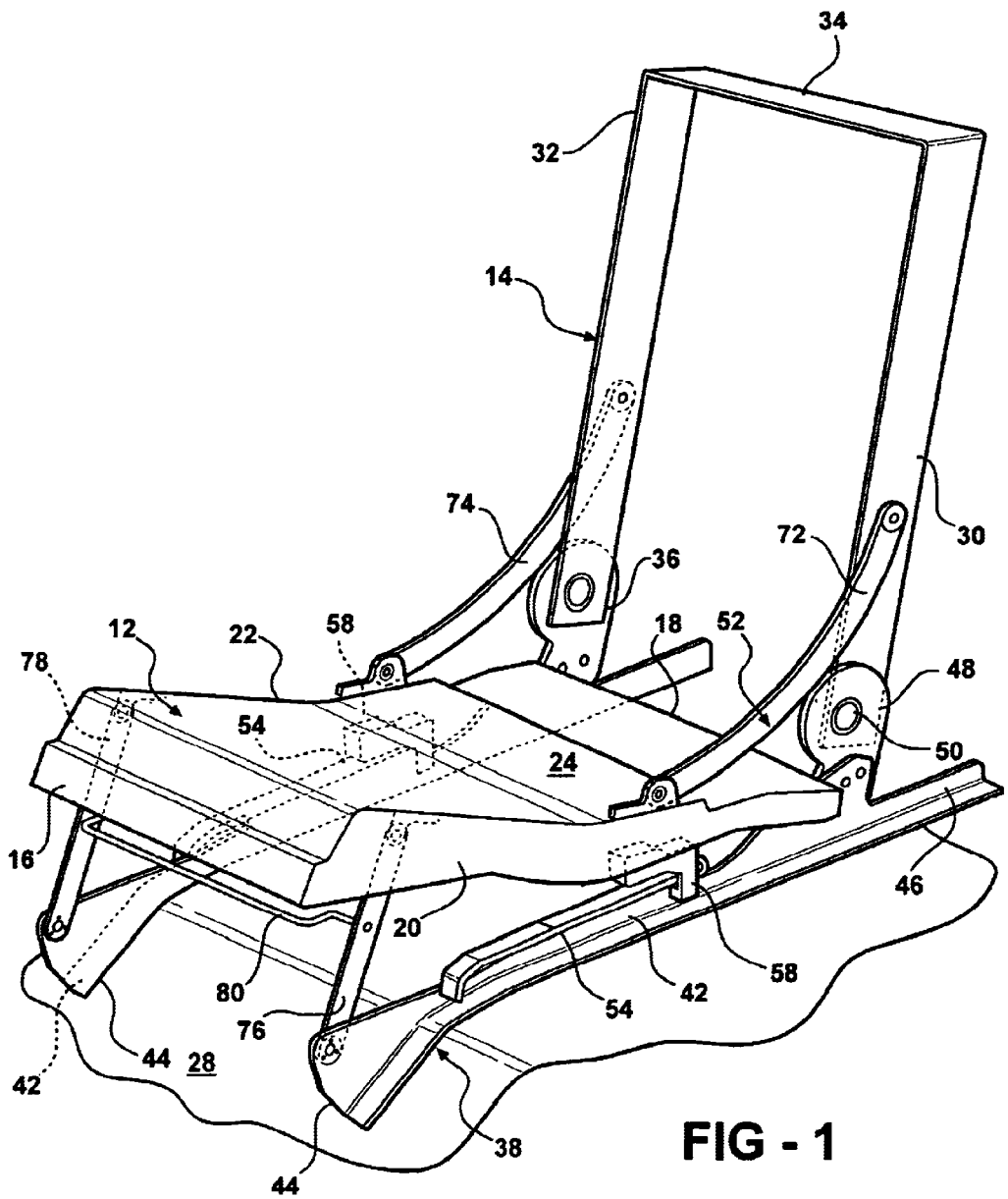
FIG. 1 is an isometric view of a automatic articulating seat assembly in a seating position.
Figure 2:
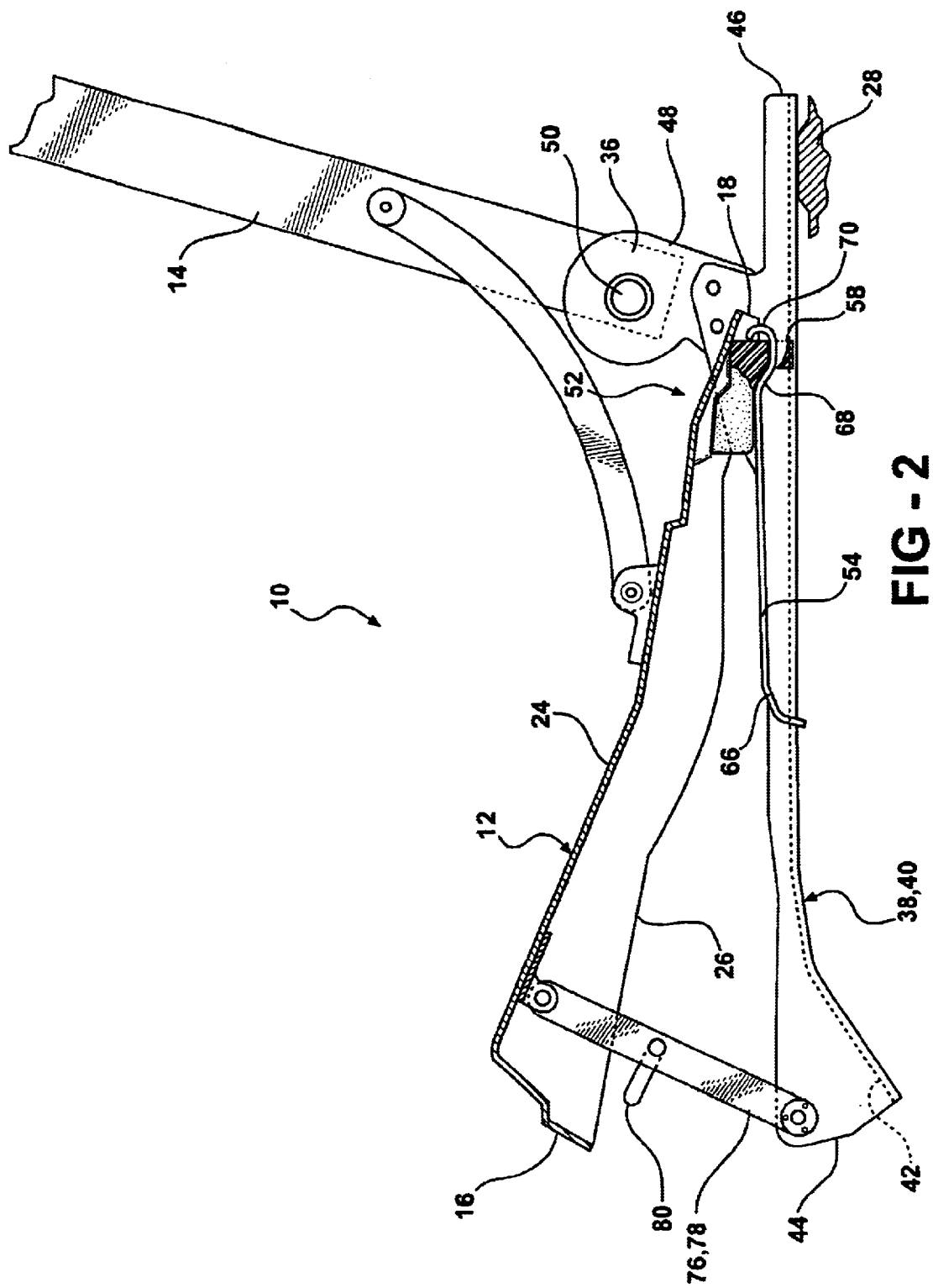
FIG. 2 is a side view of the seat assembly in the seating position.
Figure 3:
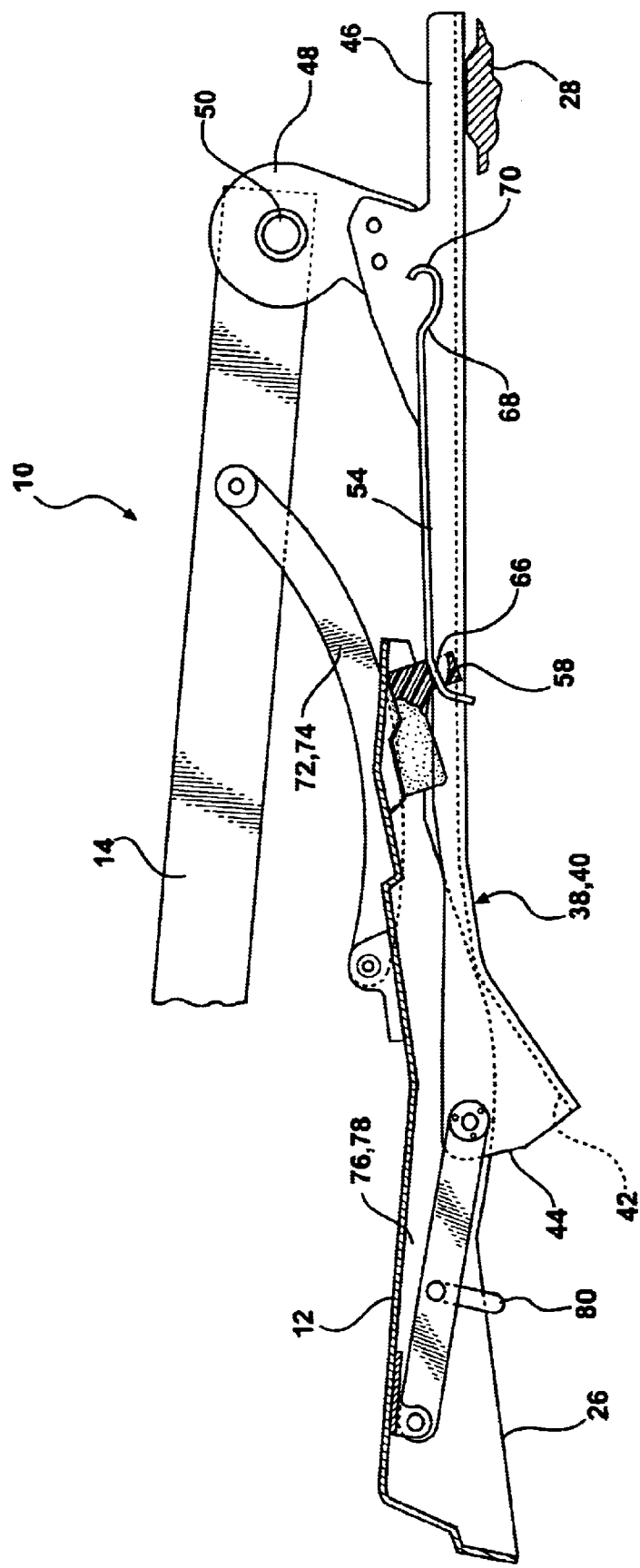
FIG. 3 is a side view of the seat assembly with the seat cushion in a stowed position the seat back in a folded position.

Referring to FIGS. 1–3, a seat assembly adapted to be secured to the floor of an automotive vehicle is generally shown at 10. The seat assembly 10 includes a generally horizontal seat cushion 12 for supporting an occupant on the seat and a seat back 14 for supporting the back of the occupant. The seat cushion 12 and seat back 14 shown in FIG. 1 are exemplified by the rigid frame structures of the seat cushion and seat back as is commonly known to one of ordinary skill in the art. It should be appreciated that the frame structures typically support a resilient cellular foam pad encased in a decorative trim cover for added comfort and appearance of the seat cushion 12 and seat back 14.

The seat cushion 12 includes a front end 16, a rear end 18 opposite the front end 16 and adjacent the seat back 14, an inboard side 20, an opposite outboard side 22, a top surface 24 extending between the front and rear ends 16, 18 and an opposing bottom surface 26 facing the vehicle floor at 28. The seat back 14 includes an inboard side 30, an opposite outboard side 32, a top portion 34 and an opposite bottom portion 36 adjacent the seat cushion 12.

A pair of spaced apart and parallel risers 38, 40 are operatively coupled to the seat cushion 12 for supporting the seat cushion 12 and mounting the seat assembly 10 to the floor 28 of the vehicle. Each riser 38, 40 includes a generally stamped elongated support plate 42 extending longitudinally between first and second ends 44, 46 aligned generally between the front and rear ends 16, 18 of the seat cushion 12. The seat cushion 12 is slidably coupled to each riser 38, 40 for movement between a seating position, as shown in FIGS. 1 and 2, and a stowed position resting against the vehicle floor 28, as shown in FIG. 3. The seat back 14 is pivotally coupled to each of the risers 38, 40 for pivotal movement between a generally upright seating position, as shown in FIGS. 1 and 2, and a folded position in a generally flat overlapping relationship with the seat cushion 12, as shown in FIG. 3. More specifically, each riser 38, 40 includes an upstanding mounting flange 48 extending upwardly from the support plate 42 adjacent the second end 46 for pivotally connecting and supporting a respective inboard and outboard side 30, 32 of the seat back 14 via a pivot mechanism 50. The pivot mechanism 50 provides the pivotal movement of the seat back 14 about the risers 38, 40 between the upright seating position and the folded position.

The seat assembly 10 further includes a slide mechanism 52 coupled between each riser 38, 40 and the seat cushion 12 for slidably articulating the seat cushion 12 along the risers 38, 40 between the seating position and the stowed position. The slide mechanism 52 includes a slide rail 54 extending longitudinally from the riser 38, 40. The slide rail 54 is formed as part of the support plate 42 extends longitudinally between the first and second ends 44, 46 and projects outwardly towards the center of the seat cushion 12 to a distal edge 56 to define an articulating path for guiding the sliding movement of the seat cushion 12 between the seating and stowed positions.

Figure 4:
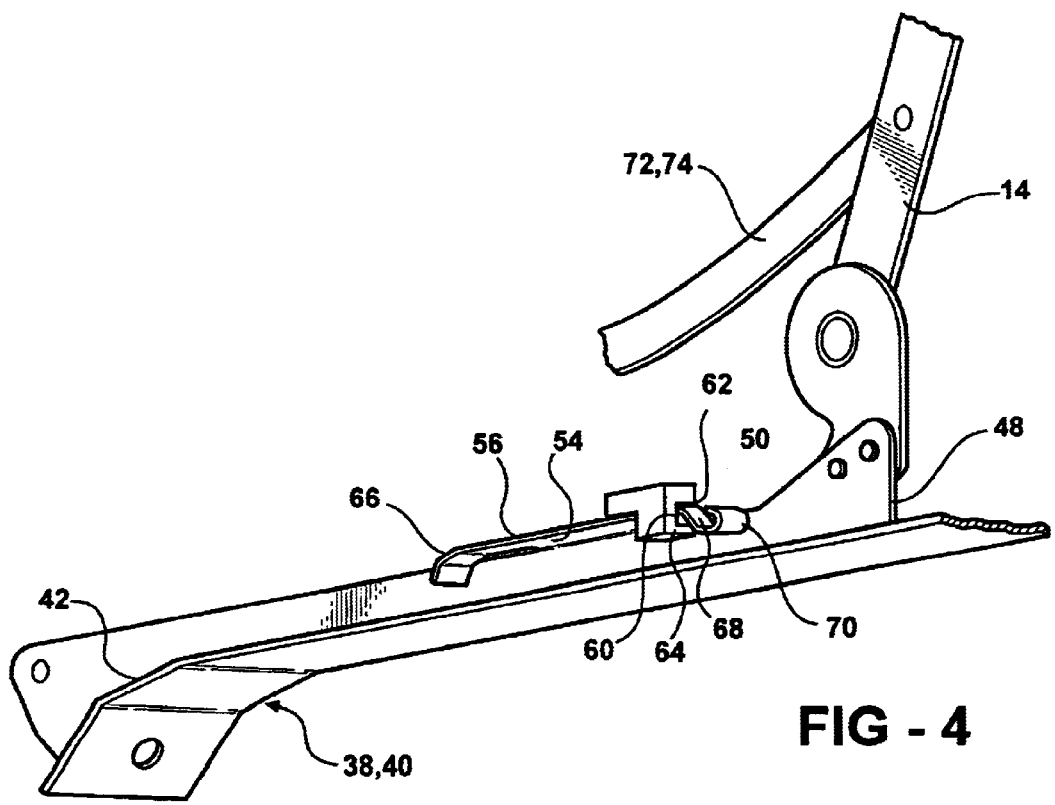
FIG. 4 is a fragmentary rear perspective view of a slide mechanism for slidably articulating the seat cushion between the seating position and the stowed position.
Figure 5:
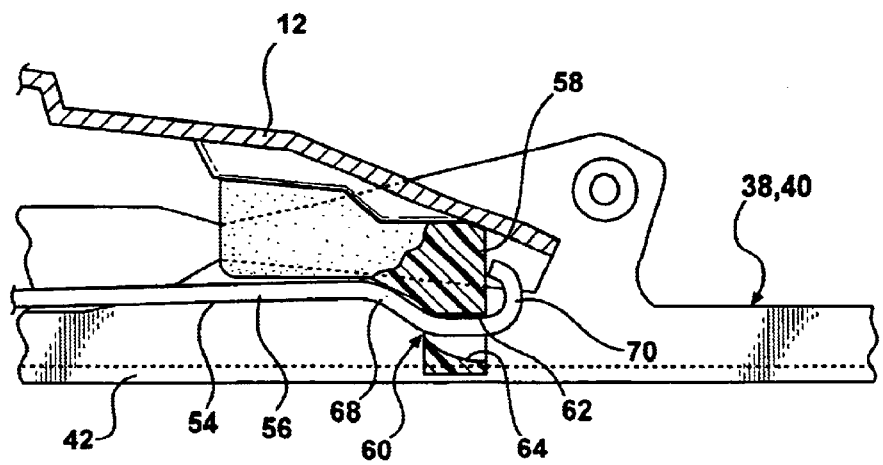
FIG. 5 is an enlarged side view of the slide mechanism.

The slide mechanism 52 further includes a slide block 58 secured to and extending from the seat cushion 12 and slidably coupled to the slide rail 54 for guiding the seat cushion 12 along the sliding articulation between the seating position and stowed position. The slide block 58 is fixedly secured to the bottom surface 26 of the seat cushion 12 adjacent each inboard and outboard side 20, 22 for sliding engagement with the adjacent slide rail 54 of each respective riser 38, 40. Referring to FIGS. 4 and 5, each slide block 58 includes a slot 60 defined by an upper ledge 62 and spaced apart lower ledge 64 for receiving the distal edge 56 of the adjacent slide rail 54 therein for guiding the slide block 58 and the seat cushion 12 along the articulating path between the first and second ends 44, 46 of the slide rail 54. The upper ledge 62 is generally flat and the lower ledge 64 is ramped, sloped, or curved from front to back, that is, in the direction from the first end 44 to the second end 46. The slide block 58 may be metal, plastic or other suitable material to assist in reducing friction and noise during sliding movement along the slide rail 54.

Additionally, each slide rail 54 includes a first ramped or curved section 66 adjacent the first end 44 defining a stop to frictionally engage and maintain the slide block 58 and seat cushion 12 in the stowed position. Similarly, the slide rail 54 also includes a second ramped or curved section 68 adjacent the second end 46 defining a stop to frictionally engage and maintain the slide block 58 and seat cushion 12 in the seating position. The slide rail 54 includes an abutment end 70 formed by an upturned or upwardly curled section at the second end 46 for engaging the slide block 58 with the seat cushion 12 in the seating position to prevent the slide block 58 from disengaging from the slide rail 54 and for defining the seating position.

A pair of first link arms 72, 74 are coupled between the seat cushion 12 and seat back 14 for automatically controlling the sliding articulation of the seat cushion 12 between the seating position and the stowed position in response to pivotal movement of the seat back 14 between the upright seating position and the folded position. Each first link arm 72, 74 includes a first end pivotally connected to the respective inboard or outboard side 20, 22 of the seat cushion 12 and an opposite second end pivotally connected to the respective inboard or outboard side 30, 32 of the seat back 14.

Finally, a pair of second link arms 76, 78 are interconnected between the front end 16 of the seat cushion 12 and the first ends 44 of the risers 38, 40 for supporting the seat cushion 12 above the risers 38, 40 and vehicle floor 28 in the seating position and translating the front end 16 of the seat cushion 12 forwardly and downwardly against the risers 38, 40 and adjacent the vehicle floor 28 in the stowed position. More specifically, each second link arm 76, 78 includes a first end pivotally coupled to the respective inboard or outboard side 20, 22 of the seat cushion 12 adjacent the front end 16 and an opposite second end pivotally coupled to the respective riser 38, 40 adjacent the first end 44 thereof. A cross member 80 extends laterally between and interconnects the space apart pair of second link arms 76, 78 to maintain even translation and sliding articulating of the front end 16 of the seat cushion 12 during movement between the seating and stowed positions.

In operation, referring to FIGS. 2 and 3, the seat assembly 10 may be manipulated from the general seating position wherein the seat cushion 12 is in the horizontal seating position and the seat back 14 is in the upright seating position by pivoting the seat back 14 about the pivot mechanisms 50 supported by the risers 38, 40. As the seat back 14 pivots forwardly and downwardly, or in the counterclockwise direction as viewed in the Figures, the first link arms 72, 74 will push on the seat cushion 12 and force the seat cushion 12 to translate forwardly along the risers 38, 40. The slide blocks 58 slide along the slide rails 54 to guide the rear end 18 of the seat cushion 12 from the second end 46 to the first end 44 of the risers 38, 40. The movement of the rear end 18 of the seat cushion 12 is generally linear along the path defined by the risers 38, 40. Simultaneously, the second link arms 76, 78 articulate or translate the front end 16 of the seat cushion 12 forwardly and downwardly from the position spaced above the risers 38, 40 to a flat position against the risers 38, 40 and vehicle floor 28.

The wedge shape of the slot 60 in the slide block 58 which is formed between the upper ledge 62 and ramped or curved lower ledge 64 allows the seat cushion 12 to pivot about the rear end 18 as the front end 16 is lowered from the elevated seating position to the stowed position against the floor 28. Additionally, the first ramped section 66 of the slide rail 54 is frictionally wedged between the upper and lower ledges 62, 64 to assist in maintaining the seat cushion 12 in the stowed position.

The seat cushion 12 may be returned from the stowed position to the seating position by simply pivoting the seat back 14 from the folded position to the upright seating position, or clockwise as shown. The first link arms 72, 74 pull on the seat cushion 12 to force the slide blocks 58 to slide along the slide rails 54 from the first end 44 to the second end 46 of the risers 40. The second link arms 76, 78 elevate and return the front end 16 to the seating position spaced above the risers 40. The abutment end 70 stops the seat cushion 12 in the seating position and the second ramped section 68 of the slide rail 54 is frictionally wedged between the upper and lower ledges 62, 64 of the slot 60 to assist in maintaining the seat cushion 12 and seat back 14 in the seating positions.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed is:

1. A seat assembly adapted to be secured to a floor of an automotive vehicle comprising:

a generally horizontal seat cushion for supporting an occupant on said seat assembly, said seat cushion movable between a seating position at least partially spaced above the vehicle floor and a stowed position resting against the vehicle floor;

a riser operatively coupled to said seat cushion for supporting said seat cushion in each of said seating and stowed positions;

a seat back pivotally coupled to said riser for movement between a generally upright seating position and a folded position in overlapping relationship with said seat cushion;

a slide mechanism coupled between said riser and said seat cushion for slidably articulating said seat cushion along said riser between said seating position and said stowed position; and a first link arm coupled between said seat back and said seat cushion for automatically controlling said sliding articulation of said seat cushion between said seating and stowed positions in response to pivotal movement of said seat back between said upright seating position and said folded position.

2. A seat assembly as set forth in claim 1 wherein said slide mechanism includes a slide rail extending longitudinally from said riser and a slide block extending from said seat cushion and slidably coupled with said slide rail for guiding said seat cushion along said sliding articulation between said seating position and said stowed position.

3. A seat assembly as set forth in claim 2 wherein said seat cushion includes a front end, a rear end opposite said front end and adjacent said seat back, an inboard side, an opposite outboard side, a top surface extending between said front and rear ends and an opposing bottom surface facing the vehicle floor.

4. A seat assembly as set forth in claim 3 wherein said riser includes an elongated support plate extending longitudinally between first and second ends aligned generally between said front and rear ends of said seat cushion.

5. A seat assembly as set forth in claim 4 wherein said slide rail is formed by said support plate extending longitudinally between said first and second ends and projecting outwardly to a distal edge to define an articulating path for sliding movement of said seat cushion between said seating and stowed positions.

6. A seat assembly as set forth in claim 5 wherein said slide block includes a slot for receiving said distal edge of said slide rail for guiding said slide block and said seat cushion along said articulating path between said first and second ends.

7. A seat assembly as set forth in claim 6 further including a second link arm interconnected between said front end of said seat cushion and said first end of said riser for supporting said seat cushion above said riser and the vehicle floor in said seating position and translating said front end of said seat cushion forwardly and downwardly against said riser and adjacent the vehicle floor in said stowed position.

8. A seat assembly as set forth in claim 7 wherein said slide rail has a first ramped section adjacent said first end defining a stop to frictionally engage and maintain said slide block and said seat cushion in said stowed position.

9. A seat assembly as set forth in claim 8 wherein said slide rail has a second ramped section adjacent said second end defining a stop to frictionally engage and maintain said slide block and said seat cushion in said seating position.

10. A seat assembly as set forth in claim 9 wherein said slide rail includes an abutment end for engaging said slide block with said seat cushion in said seating position to prevent said slide block from disengaging from said slide rail and for defining said seating position.

* * * * *